J. A. HOUSE.
SEWING-MACHINE.

No. 175,463.  Patented March 28, 1876.

4 Sheets—Sheet 1.

WITNESSES
William A. Skinkle
Wm J. Rufort

By his Attorney.

INVENTOR
James A. House.
W. D. Baldwin

J. A. HOUSE.
SEWING-MACHINE.
No. 175,463. Patented March 28, 1876.
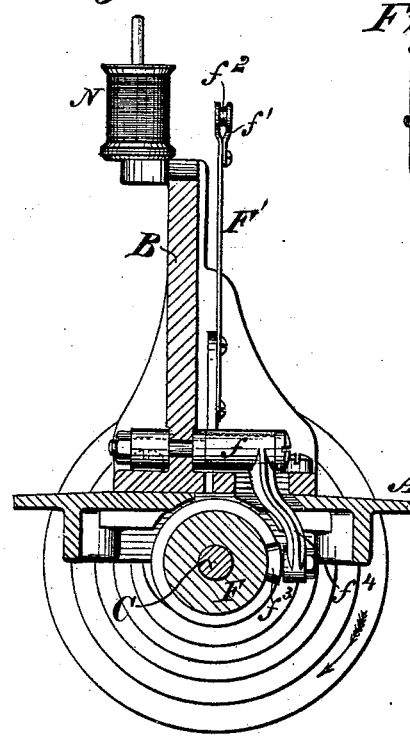
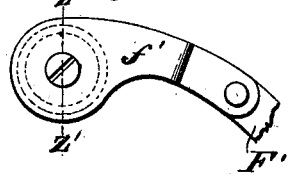
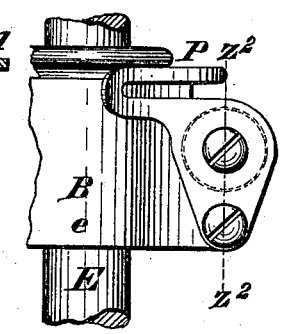
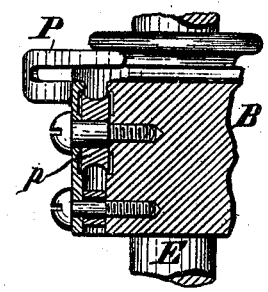
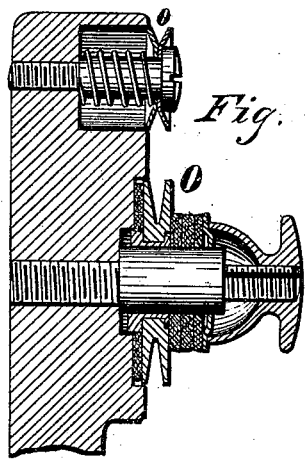
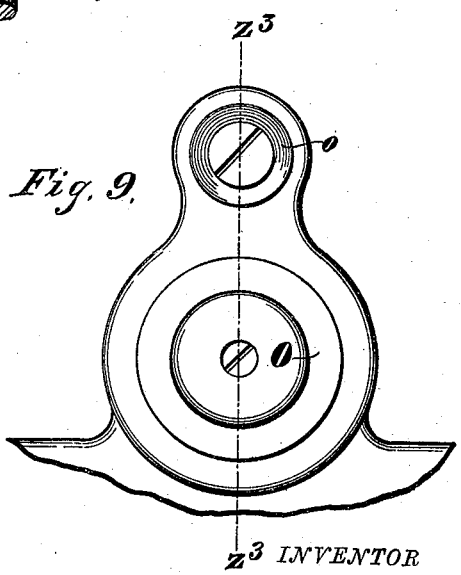
WITNESSES
William A. Skinkle
Wm J. Peyton
By his Attorney
INVENTOR
James A. House.
Wm D. Baldwin

J. A. HOUSE.
SEWING-MACHINE.

No. 175,463. Patented March 28, 1876.

WITNESSES
Wm A Skinkle
Wm J Peyton

By his Attorney

INVENTOR
James A House,
W D Baldwin

UNITED STATES PATENT OFFICE.

JAMES A. HOUSE, OF BRIDGEPORT, CONN., ASSIGNOR TO THE WHEELER & WILSON MANUFACTURING COMPANY, OF SAME PLACE.

IMPROVEMENT IN SEWING-MACHINES.

Specification forming part of Letters Patent No. 175,463, dated March 28, 1876; application filed December 11, 1875.

*To all whom it may concern:*

Be it known that I, JAMES A. HOUSE, of Bridgeport, in the county of Fairfield and State of Connecticut, have invented certain new and useful Improvements in Sewing-Machines, of which the following is a specification:

My invention more especially relates to sewing-machines of the Wheeler & Wilson type, particularly adapted for sewing leather and heavy fabrics, and constitutes an improvement on the machine shown and described in Letters Patent of the United States granted to me March 5, 1872, No. 124,360, and December 16, 1873, No. 145,570.

The subject-matter claimed hereinafter specifically will be designated.

Figure 1:
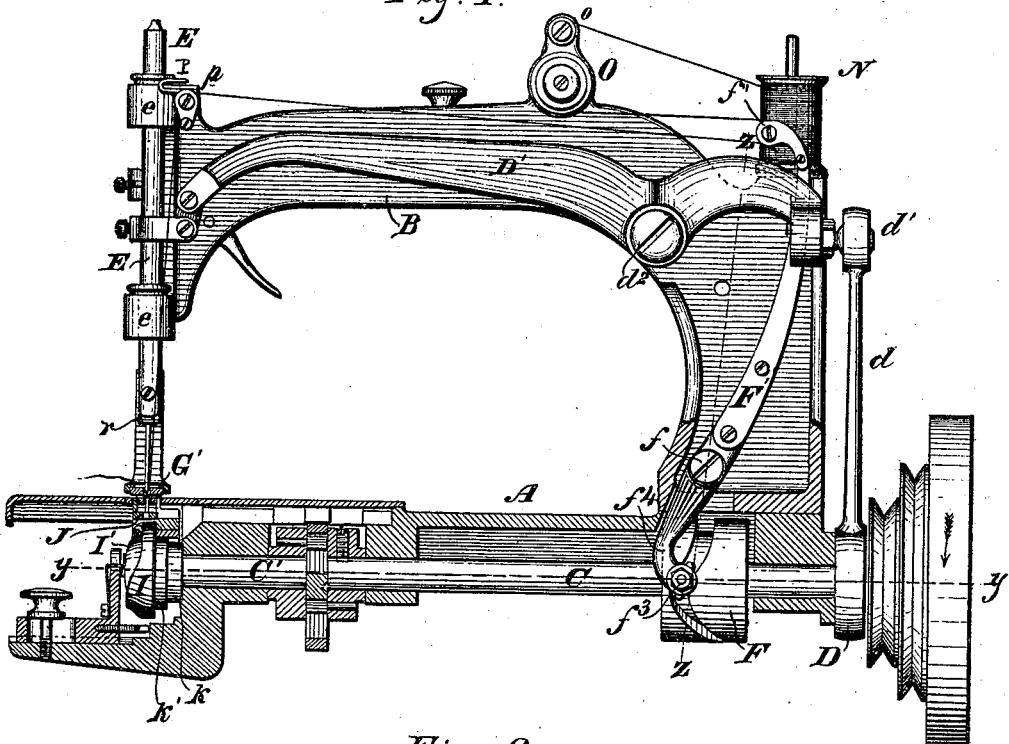
Figure 2:
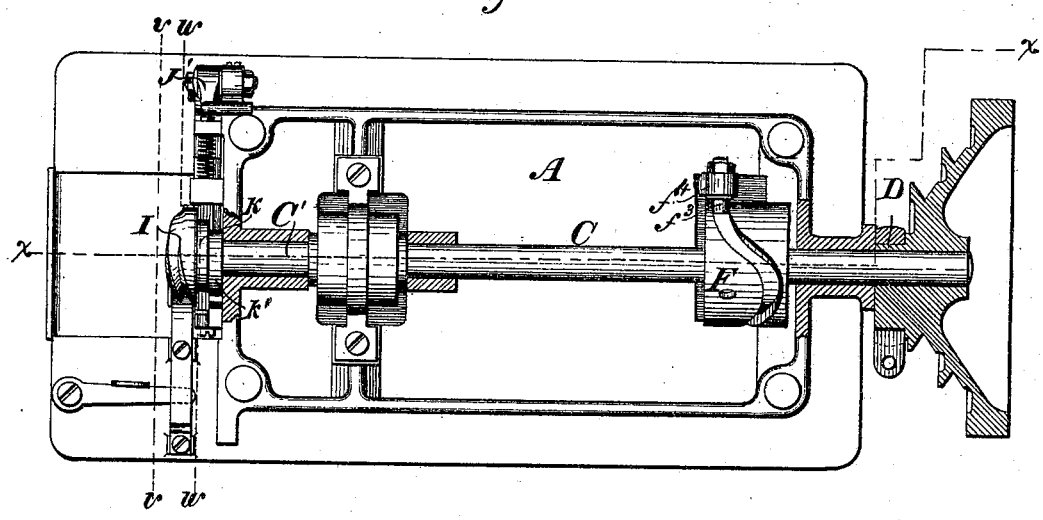
Figure 10:
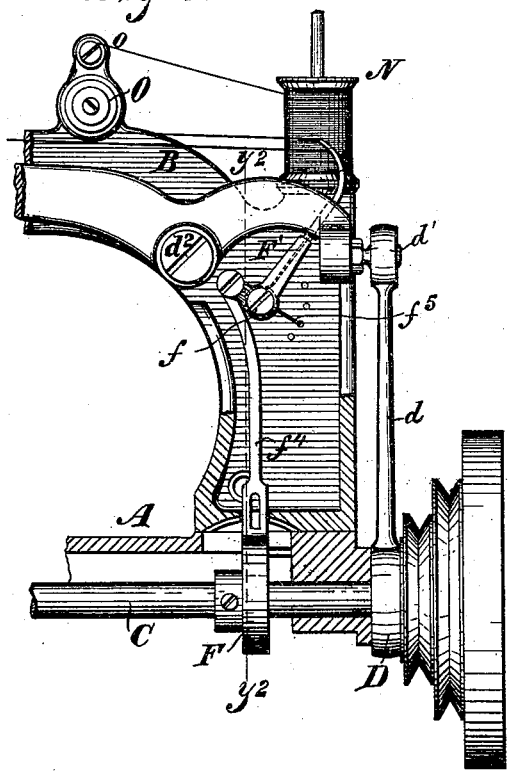
Figure 11:
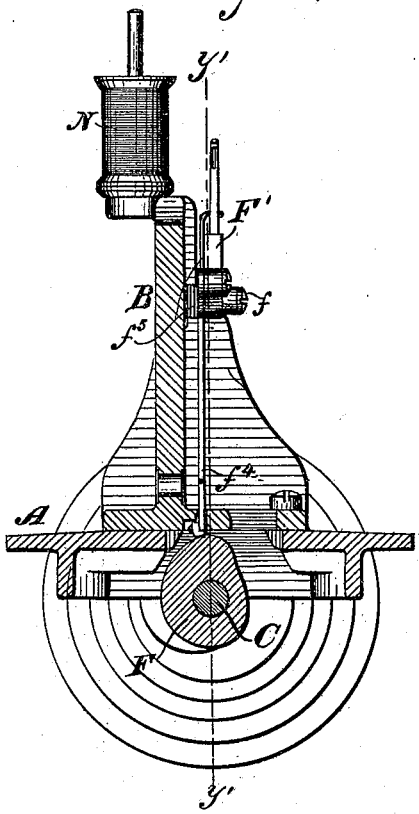
Figure 12:
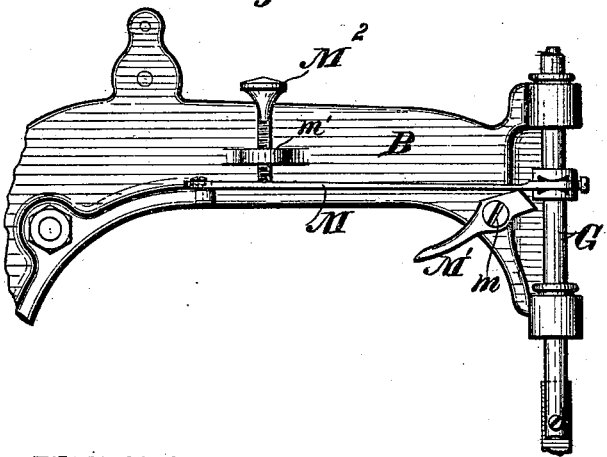
Figure 13:
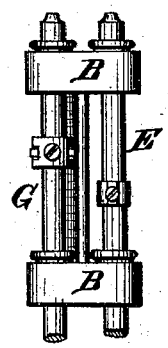
Figure 14:
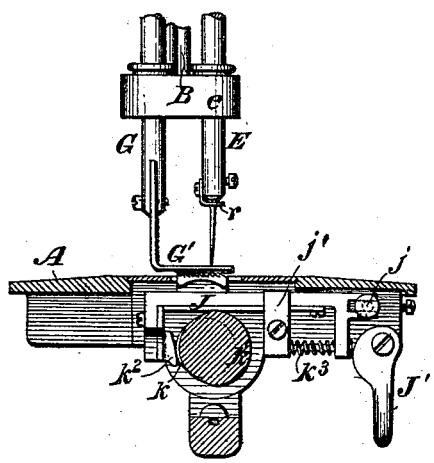
Figure 15:
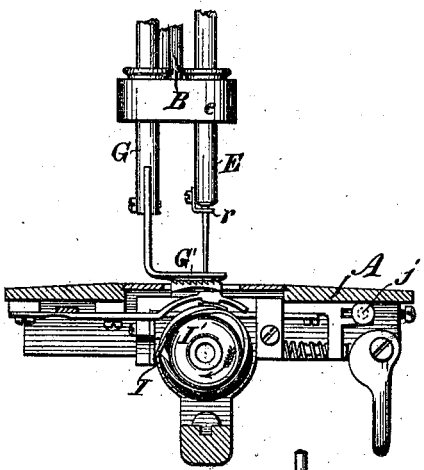
Figure 16:
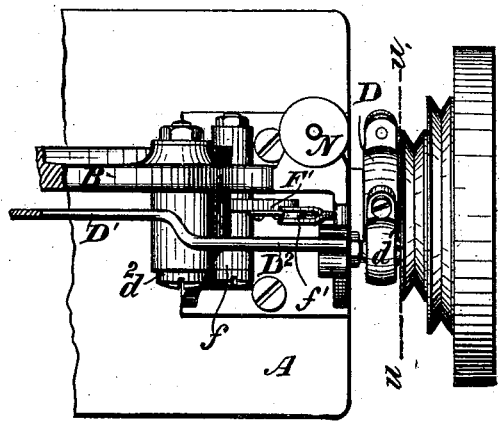
Figure 17:
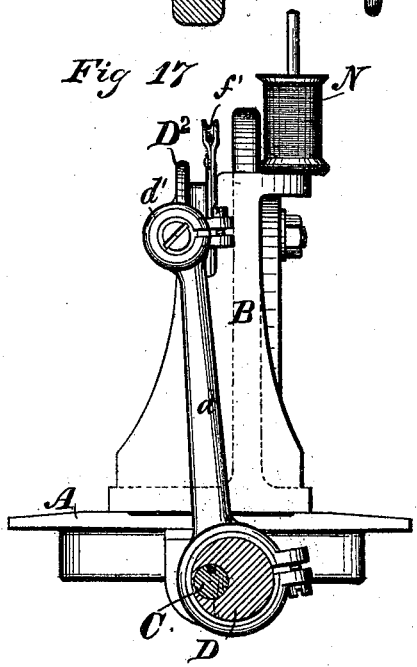

In the accompanying drawings, which represent my invention as embodied in the best way now known to me, Figure 1 represents a side view of the machine, partly in section, on the line $x\ x$ of Fig. 2. Fig. 2 represents a bottom-plan view of the apparatus, partly in section, on the line $y\ y$ of Fig. 1. Fig. 3 represents a vertical transverse section of the machine, on the line $z\ z$ of Fig. 1, with the needle-arm and its driving-pitman omitted; Fig. 4, a vertical transverse section through the end of the take-up arm, on the line $z^1\ z^1$ of Fig. 5; Fig. 5, a side view of the end of the take-up arm; Fig. 6, a side view of a portion of the thread-guide; Fig. 7, a vertical section therethrough, on the line $z^2\ z^2$ of Fig. 6. Fig. 8 represents a vertical section through a portion of the tension apparatus, on the line $z^3\ z^3$ of Fig. 9, which represents a face view of said apparatus. Fig. 10 represents a side view of a portion of the machine, partly in section, on the line $y^1\ y^1$ of Fig. 11, showing a modified form of take-up apparatus; and Fig. 11, a vertical section therethrough, on the line $y^2\ y^2$ of Fig. 10, with its needle-arm and driving-pitman omitted. Fig. 12 is a side view, showing the details of the pressure-spring. Fig. 13 is a front view of the upper portions of the pressure-bar and needle-bar. Fig. 14 represents a vertical transverse section through the machine, on the line $w\ w$ of Fig. 2, showing the details of the feed mechanism; and Fig. 15 is a similar section on the line $v\ v$ of Fig. 2. Fig. 16 represents a plan view of the rear portion of the bracket-arm and needle-lever; and Fig. 17, a transverse sectional view of the machine, on the line $u\ u$ of Fig. 16.

The mechanism is mounted upon a frame, A, supporting a bracket-arm, B. A shaft, C, driven by power applied in any suitable well-known ways, carries a cam or eccentric, D, which, through a pitman, $d$, and ball-and-socket joint, $d^1$, vibrates a needle-arm, D', rocking on its fulcrum $d^2$ on the bracket-arm B, and linked at its forward end to a needle-bar, E, reciprocating endwise in guides $e$ in the bracket-arm. By reference to Figs. 1, 16, and 17, it will be observed that that portion of the needle-lever in front of its fulcrum lies in the same vertical plane as the driving-shaft, while that portion in rear of its fulcrum $d^2$ lies in a plane outside of this vertical line, the offset amounting, in a full-sized machine, to about a half inch.

By this mode of construction I am enabled not only to provide a space between the bracket-arm and the rear portion of the needle-lever, in which the take-up may oscillate, but I am also enabled to impart a variable motion to the needle at each end of its stroke, the turn at the bottom stroke of the needle being quicker than that at its top, while the up and down strokes are made at equal speed; and as it is one of the peculiarities of the organization of this machine that the take-up retracts to complete the stitch while the needle is at the top of its stroke and out of the cloth, I am enabled by the construction above described to gain more time for the action of the take-up without diminishing the speed of the machine.

The driving-shaft C also carries another cam, F, which vibrates a take-up arm, F', on its fulcrum $f$ on the bracket-arm. The front end of this take-up arm or lever is provided with an eye or loop, $f^1$, through which the upper thread passes, as well as with the roller $f^2$, over which said thread runs.

In Figs. 1, 2, and 3 of the drawings, the take-up cam is shown as grooved and acting upon an oscillating tappet, $f^3$, mounted on the lower part $f^4$ of a take-up lever, the fulcrum $f$ of which is in the form of a rock-shaft, the parts being so constructed as to bring the take-up arm F' close to the bracket-arm B, and between it and the needle-arm.

Figs. 10 and 11 show a modified form of construction, in which a plain-surfaced cam, F, is used, which acts directly upon the end of a link, $f^4$, connected with the crank on the rock-shaft $f$, which operates the take-up arm F' against the tension of a spring, $f^5$, the pressure of which may be varied by inserting the spring in one of a series of holes in the bracket-arm. In this form of construction the take-up is moved up slowly by the cam, and thrown forward quickly by the spring, when permitted so to do by the cam.

The cam is made adjustable around its shaft by well-known means, so as to secure the proper relative adjustment of the needle, the revolving hook, and the take-up arm. In practice I prefer the grooved cam, as by it I am enabled to impart a wider range of motion, and in a more positive manner, than that shown in Figs. 10 and 11. In my patents before mentioned it will be observed that the needle-lever was driven by a grooved cam, and the take-up also operated by a cam.

By driving the take-up arm by the grooved cam shown in Figs. 1, 2, and 3, a wider range of motion is obtained with a smaller periphery of cam than could be done by the use of an eccentric such as shown in Figs. 10 and 11; but this deficiency I have compensated by the link and crank arrangement of the take-up shown in the last-named figures. The shaft C also imparts a differential movement to a shaft, C', carrying a revolving hook, I, in which a bobbin, I', is secured. The machine is also provided with a four-motion feed.

In my patents before mentioned the feed moved the fabric in the same direction as that in which the hook rotated, the bracket-arm standard and driving connections in those machines being on the left of the operator when it worked.

I find it preferable, in practice, to reverse that arrangement, and the present machine is consequently so organized that the cloth is fed in a direction opposite to that of the rotation of the hook. In the old machines the upward and forward movements of the feed could be effected by a single cam, but such arrangement would be impracticable with the present feed. I therefore mount upon the forward section C' of the driving-shaft two cams, $k\ k^1$, acting upon the feed-bar J, the former being the feed-cam and the latter the lifting-cam. The slide-bar J reciprocates and rocks on a fulcrum-pin, $j$, and is held in place by a guide-block, $j'$. The cam $k$, in its forward motion, acts on a step, $k^2$, on the sliding frame to give the forward feed, while the cam $k^1$ lifts the feed-bar J by acting directly upon it. The feed-bar is retracted, when released from the cam, by a spring, $k^3$, and as this spring lies below the fulcrum-pin $j$, it also serves to draw down as well as to retract the feed-bar. The length of the back stroke of the feed is regulated by a cam or stop lever, J', the forward feed always remaining the same. The other details of the hook and bobbin, being similar to those shown in my former patents, require no special description here.

The needle works, as usual, through a presser-foot, G', mounted on the presser-arm G, movable freely endwise in its bearings in the bracket-arm B, and pressed down to its work by an adjustable spring, M, and lifted, when required, by a self-locking cam-lever, $M^1$, rocking on its fulcrum $m$ on the bracket-arm, and acting on the spring. The tension of the spring is regulated by a set-screw, $M^2$, passing through a lug, $m'$, on the bracket-arm, and bearing on the pressure-spring. The presser-foot mechanism above described is substantially the same as that shown in my patent of December 16, 1873, and, of course, is not herein claimed. The thread passes from the spool N over the thread-check $o$, once around the tension-pulley O, thence around the take-up roller $f^2$, thence over the guide-roller $p$, the guard P of which keeps it in place, thence down through a thread-guide, $r$, on the needle-bar, thence through the eye of the needle. The bobbin is supplied with thread as usual. The hook is driven with a speed variable relatively to that of the driving-shaft, although completing its revolution in the same time, as explained in my former patents. The needle-arm, at proper intervals, moves downward, piercing the fabric and carring down its loop of thread to be engaged by the hook, and rises quickly and pauses slightly at the end of its stroke, the take-up tightening the stitch during the latter portion of the rise of the needle, and also during the first part of the descent of the needle to form the succeeding stitch, whereas, in my patents above mentioned, the pause of the needle in its upward movement took place while it was still in the fabric. I am consequently enabled, with my present invention, to attain a higher speed than has been practicable with the former machines.

I claim as of my own invention—

1. The combination, substantially as hereinbefore set forth, of the driving-shaft revolving with a uniform speed, the hook revolving at a variable speed relatively thereto, the driving-cam, its pitman-connection, and the needle-lever, with its short arm forming an offset from the long arm, and occupying a different vertical plane from that passing longitudinally through the driving-shaft, whereby a space is left between the needle-lever and the bracket-arm for the play of the take-up lever, and a longer pause is given to the needle at the end of its upward stroke than at the end of the down-stroke, for the purposes set forth.

2. The combination, substantially as hereinbefore set forth, of the driving-shaft revolving with a uniform speed, the hook revolving at a variable speed relatively thereto, the needle-lever, with its short arm forming an offset from the long arm, and occupying a different vertical plane from that passing longitudinally through the driving-shaft, the grooved cam on the driving-shaft, and the take-up lever vibrated thereby, whereby the take-up may be located between the needle-lever and bracket-arm, and complete the stitch during the elevation of the needle.

In testimony whereof I have hereunto subscribed my name.

JAMES A. HOUSE.

Witnesses:
F. HURD,
A. R. LACEY.